Patented June 4, 1935

2,003,696

UNITED STATES PATENT OFFICE 2,003,696

UTILIZATION OF COTTON PLANT CELLULOSE

Gideon Howard Palmer, East Orange, N. J.

No Drawing. Original application May 27, 1933, Serial No. 673,309. Divided and this application March 26, 1934, Serial No. 717,433

7 Claims. (Cl. 260—100)

This invention is a divisional application of my application, Serial Number 673,309, filed May 27, 1933 for Utilization of cotton plant.

One of the objects of my invention is the transformation into new products of cellulose purified from the cotton plant (as the stalks and leaves, and not the fruit or cotton fibers as such) into xanthated esters of cellulose such as viscose, for the commercial formation of products for which viscose has and is being employed, such as circular or other shaped filaments, films and sheets.

Another object of my invention is the formation of hydrated cellulose products by the de-esterification of xanthated cellulose, and the utilization of the same in the arts, said cellulose being utilized from purified cellulose obtained from the cotton plant for preparation of ester which is afterwards to be de-esterified into a hydrated cellulose product.

Another object of my invention is to take the product obtained by treatment, purification and utilization of normally discarded portions of the cotton plant, and transform the same into a xanthated cellulose suitable for rayon and film formation, as detailed herein.

Other objects of my invention will be disclosed in and by the description to follow.

It has been stated that that portion of the cotton plant which does not consist of cotton, is about 98% of the weight of the entire plant, that is, in the normal growing of cotton, only about 2% of the same is at the present time utilizable. And it has further been stated that there is available in the United States alone something like five hundred millions pounds of cotton plant annually, which at the present time is not only waste material, but is actually detrimental to the agriculturalist by virtue of the fact that if not utilized, it harbors pests destructive to the next year's cotton crop.

Furthermore, this waste material, left on the ground as is usually the custom is a deleterious procedure, in that it forms a winter resting place for the cotton boll weevil in some of its resting forms.

In the United States and elsewhere, the main stem of the cotton plant grows generally to a height of from three to six feet, and has numerous branches. The main stem is largely composed of bark, woody tissue and a central pithy portion. The tops of the plants and the numerous short branches contain relatively smaller proportions of woody fiber which, considerable as the annual tonnage of the cotton plant is, may be dispensed with in my process if desired, only the central stem and the larger radiating branches being utilized in carrying out my invention. Therefore, my invention considers in the main, the harvesting and utilization primarily of the main plant portions soon after the close of the harvesting season (the cotton-picking operation), and the recovery of the stems.

Usually after the seed cotton has been picked the stalks and remainder of the plant are discarded, often left on the field to be plowed under in the next spring cultivation. This provides food and a resting place for the boll-weevil and cotton worm, and a habitation during the winter.

Therefore any process evolved for the commercial utilization of the cellulosic or other portion of the cotton plant possesses an entomological value, the removal of the refuse in the fall being one of the most important steps in cotton raising.

In my invention of which the present invention is a division, I have described methods whereby a portion of the cellulose contained in the cotton plant other than the cotton cellulose which is harvested, may be transformed into a utilizable product high in alpha-cellulose, and relatively low in hemi-cellulose and gamma-celluloses, and the primary object of this invention is the utilization of such purified cellulose high in alpha-cellulose content, for the production of esters such as cellulose sulfocarbonate (cellulose xanthate).

The cellulose which is used for this purpose has a composition shown by the following general, composite analysis.

| | Per cent |
|---|---|
| Moisture (loss in weight at 105° C.) | 1.5 |
| Ash (inorganic portion) | 0.28 |
| Water-soluble portion | 0.24 |
| Fat, wax (Soxhlet extraction) | 0.45 |
| Alpha-cellulose | 89–96 |

In the transformation of this purified cellulose of high alpha-cellulose content and substantially free from the undesirable cellulosic products from an esterification viewpoint, it is necessary to modify materially in some instances, the steps of transformation of the same into viscose and the de-esterification, precipitation or transformation of the same into a de-esterified product usually designated as a hydrated cellulose as will appear from the following description of a series of steps which I have found to lead to satisfactory results, but which are detailed here merely for illustrative purposes, it being understood that the several steps in the process may be varied within considerable limits, depending upon the physical constants of the cellulose being operated upon, the concentration, time factors and temperatures of the various steps, and the treatment accorded a succeeding step dependent upon the method of procedure in a subsequent operation, as is well understood by those conversant with the art of the practical and commercial production of viscose from various sources and classes of raw materials.

*Preparing viscose.*—The sheets of purified cellulose from cotton plant stock and of uniform thickness and relative porosity and hence penetratibility by reagents, are first placed in a temperature and moisture controlled room, whereby a 5-6% moisture results in the sheets at a temperature of 18° plus or minus 1° (all temperatures stated herein being centigrade), the sheets having previously been cut to the size desired.

Said sheets are then introduced into a mercerizing or "steeping" apparatus, and an excess of aqueous sodium hydroxide solution of about 18.4% absolute NaOH run in to immersion of the sheets, the temperature of the alkaline solution being preferably within 0.2° of 17.5°, which is materially lower than the usual mercerization temperature for suitable alkalicellulose for viscose formation wherein wood pulp or cotton cellulose in the purified condition is used for the cellulose.

My explanation for this material departure from well established practice, is that alpha-cellulose from cotton stalks and cotton plant is more readily susceptible to chemical treatment by virtue of its comparatively augmented reactivity in comparison with other forms of cellulose used in this art at the present time. And in many of the published processes for conversion of cellulose crude as cotton plant into utilizable cellulose, no attempt appears to have been made to so conduct the various steps of purification so as to conserve to the maximum the amount of alpha-cellulose present in the final product, and I attribute the unusually low yield of cellulosic material obtained by them, in general, to improper or inadequate appreciation of this fact of the ultra-susceptibility of the alpha-cellulosic portion of cotton plant to chemical and physical treatment, and its heretofore lack of appreciation by workers in this field.

The sodium hydroxide solution is allowed to contact with the cellulose sheets for less than 1.5 hours, and usually less than 1 and one-quarter hours, whereas the normal practice with cotton is for immersion in the alkali solution for 2 to 3 hours. In either event, circulation of alkali solution during the mercerization period is considered advisable. The excess solution is expressed from the sheets until the same weighs about 2.85 times the weight of the original cellulose taken, then shredded or disintegrated at a temperature of about 17° (the temperature of reaction being controlled by artificial refrigeration meanwhile) until the particles obtained are about 1-2 square millimeters area.

The shredded alkalicellulose "crumbs" are then transferred to metal receptacles with tightly fitting covers, about 35-45 pounds per receptacle, and as soon as possible placed in a temperature controlled room at about 17°-17.5° (usual ageing temperature 19.5°) for 40-45 hours (usual ageing period 50-65 hours), the contents of the cans being shaken at intervals of several hours in the interim.

The light, fluffy product is then placed in a closed, rotatable container, spherical, hexagonal or octagonal, and carbon bisulfide in vapor form sprayed in while the container is in motion (about 3-5 r. p. m.), the amount of bisulfide admitted being about 12% of the original weight of the cellulose taken.

When the contents of the xanthator or churn has attained that shade of orange usually spoken of as carrot color which experience indicates the period of maximum xanthation has been reached, and which with cotton plant alpha-cellulose is usually reached in 50-55 minutes (normal with other celluloses 65-80 minutes), vacuum is applied to the churn to remove free carbon bisulfide vapors, and the contents of the churn transferred to a covered receptacle with rotating or stirring device therein, wherein dilute caustic soda is placed of concentration and volume so that the dissolved xanthate (now usually spoken of as viscose) after stirring for 1.5-2 hours, has a cellulosic content of about 6.8% and an alkalinity of 6.5% or thereabouts expressed as sodium hydroxide. Upon examination of this "solution" after proper filtration, there should be apparent on low power magnification, none, or at most but a trace, of nearly colorless and transparent undissolved mucilaginous particles.

The dissolved xanthate (viscose solution) is then transferred to the "ripening" room, and there kept within 0.2° of 19° for about 85 hours (normal ripening period about 105-120 hours) and until a sample withdrawn, diluted with distilled water and treated with 10% acetic acid in the usual manner, gives an acetic acid test of 8-8.5 cc., thus indicating that the viscose has reached that degree of ripening or stage of depolymerization optimum for spinning purposes, for casting into films or for extrusion into sheets of indeterminate length. The solution is then projected through the determined orifices into a suitable setting or coagulating medium, and from this point onward treated by methods now known in the art.

The above method is detailed merely for illustrative purposes only, and may be varied within wide limits of manipulation and the factors of time, concentration and temperature without departing from the essence of my invention, as is to be understood by those skilled in the art to which this invention appertains. But, in contradistinction to the treatment of purified wood pulp and purified cotton cellulose as linters intended to be used for the same or analogous purposes, it is to be noted that the various steps considered optimum in the present day commercial practice of viscose formation utilizing cotton cellulose or a mixture of cotton cellulose and wood cellulose do not yield a product of optimum and desirable properties when applied to cotton plant cellulose properly purified or alphacellulose obtained from the same.

And conversely, due to the relatively ultra-susceptibility of cotton plant cellulose over other celluloses or cellulose mixtures now employed for the commercial preparation of viscose for the uses as herein set forth, it is obvious that in general, in manipulating the same for viscose production in the several approved steps necessary for that conversion, the concentrations in general are lower, the temperatures lower, the ageing and ripening periods considerably abbreviated, and other basic factors are materially modified to accord with the difference in the original cellulose.

The word "cellulose" as is understood, is a generic name applied to a class of bodies of the same aggregate formula but differing fundamentally in their susceptibility to attack by reagents and the properties of the compounds formed as the result of such treatment, especially in the properties of their esters and ethers, of solubility, tensile strength, elasticity, stability and viscosity. This is especially recognized in the industry employing some form of viscose, as is shown by the fact that wood pulp cellulose and cotton cellulose in the purified condition are used, but the steps in the treatment vary considerably due to these fundamental differences in reactivity and the physical constants of the products formed therefrom.

I have found, therefore, as the culmination of my researches, that another form or species or kind of cellulose or cellulosic material is obtainable from the proper treatment of cotton plant, and have set forth therein approved methods of obtaining said cellulose or cellulosic material of a high degree of purification and the transformation of the same by a process essentially different in its working conditions from those now used in the viscose industry, which means from those used in the transformation of wood cellulose and cotton cellulose into viscose of optimum physical characteristics for the purposes intended, and have set forth herein those conditions and those fundamental variations in the respective steps whereby such cellulose may be used under the most approved conditions.

Therefore, what I claim is:—

1. A process for the manufacture of viscose from alpha cellulose obtained from purified cotton plant (from which the cotton has been removed), comprising immersing the cellulose in an alkaline solution of about 18.4 per cent sodium hydroxide at about 17.5° for less than 1.5 hours, removing excess alkali solution until the alkali cellulose weighs about 2.85 times the weight of the original cellulose taken, shredding to a predetermined particle size, at about 17°, xanthating in a rotating container with carbon bisulfide, dissolving the xanthated cellulose in sodium hydroxide solution until said solution has a cellulosic content of about 6%–8% and alkalinity of about 6.5%, then ripening at about 19° until the desired degree has been obtained.

2. A process for the production of viscose suitable for filament formation from alpha cellulose obtained from purified cotton plant (from which the cotton has been removed), comprising immersing the cellulose in a mercerizing solution, removing excess alkali solution therefrom, shredding to a size of about 1–2 square millimeters area, ageing at about 17° for 40–45 hours, xanthating with gaseous carbon bisulfide, dissolving the xanthated cellulose in sodium hydroxide solution with stirring, then ripening at about 19° until an acetic acid test of 8–8.5 cubic centimeters is obtained.

3. A process for the production of xanthated cellulose from purified cotton plant (from which the cotton has been removed) cellulose, comprising immersing the cellulose in a solution of about 18.4% sodium hydroxide at about 17.5° for less than 1.5 hours, shredding, ageing, xanthating with about 12% carbon bisulfide based on the weight of the original cellulose, dissolving the xanthated cellulose so obtained in sodium hydroxide solution until said solution has a cellulosic content of about 6–8% and alkalinity 6.5%, then ripening until a desired degree has been reached.

4. A process for the production of viscose from alpha cellulose obtained from purified cotton plant (from which the cotton has been removed), comprising immersing the cellulose in a mercerizing solution for more than one hour, removing excess alkali solution, shredding to a predetermined particle size, ageing at about 17°, xanthating with about 12% carbon bisulfide based on the weight of original cellulose for about 50 minutes, dissolving the xanthated cellulose in sodium hydroxide solution with stirring, then ripening at about 19° for about 85 hours.

5. A process for the manufacture of viscose suitable for filament formation from alpha cellulose obtained from purified cotton plant (from which the cotton has been removed), comprising immersing the cellulose in a solution containing about 18.4% sodium hydroxide at about 17.5°, for less than 1.5 hours, removing excess alkali solution until the alkali cellulose weighs about 2.85 times the weight of the original cellulose taken, shredding to a size of about 1–2 square millimeters area, ageing about 17° for 40–45 hours, xanthating with carbon bisulfide, dissolving the xanthated cellulose in sodium hydroxide solution until the same has a cellulosic content of about 6–8%, an alkalinity of about 6.5%, then ripening at about 19° until an acetic acid test of 8–8.5 cubic centimeters is obtained.

6. A process for the manufacture of xanthated cellulose from purified cotton plant (from which the cotton has been removed) cellulose, comprising immersing the cellulose in a mercerizing solution for more than one hour, removing excess alkali solution, shredding, ageing, xanthating in a rotating container with carbon bisulfide, dissolving xanthated cellulose in sodium hydroxide solution with stirring, then ripening to the desired degree.

7. A process for the production of material from viscose suitable for filament formation from alpha cellulose obtained from purified cotton plant (from which the cotton has been removed), comprising immersing the cellulose in an aqueous solution containing about 18.4% sodium hydroxide at about 17.5° for more than one hour, removing excess alkali solution, shredding to a pre-determined particle size, ageing at about 17°, xanthating with gaseous carbon bisulfide, dissolving the xanthated cellulose in sodium hydroxide solution, then ripening the same at about 19° for about 85 hours.

GIDEON HOWARD PALMER.